United States Patent
Diamant

(10) Patent No.: US 8,065,440 B2
(45) Date of Patent: Nov. 22, 2011

(54) ENABLING AND DISABLING DEVICE IMAGES ON A PLATFORM WITHOUT DISRUPTING BIOS OR OS

(75) Inventor: Nimrod Diamant, Ksar-Saba (IL)

(73) Assignee: Intel Corporation, Santa Clara, CA (US)

(*) Notice: Subject to any disclaimer, the term of this patent is extended or adjusted under 35 U.S.C. 154(b) by 24 days.

(21) Appl. No.: 12/756,229

(22) Filed: Apr. 8, 2010

(65) Prior Publication Data

US 2010/0191873 A1 Jul. 29, 2010

Related U.S. Application Data

(63) Continuation of application No. 11/174,406, filed on Jun. 30, 2005, now Pat. No. 7,725,608.

(51) Int. Cl.
G06F 3/00 (2006.01)
G06F 15/177 (2006.01)
G06F 9/44 (2006.01)

(52) U.S. Cl. .............. 710/2; 710/62; 709/220; 709/221; 709/223; 709/224; 709/226

(58) Field of Classification Search .................. None
See application file for complete search history.

(56) References Cited

U.S. PATENT DOCUMENTS

| | | | |
|---|---|---|---|
| 6,192,434 B1* | 2/2001 | Wallach et al. ............... | 710/302 |
| 6,715,070 B1* | 3/2004 | Peloquin et al. ............... | 713/1 |
| 6,826,580 B2* | 11/2004 | Harris et al. .................. | 1/1 |
| 6,874,060 B2* | 3/2005 | Blood et al. ................... | 711/111 |
| 7,093,086 B1 | 8/2006 | van Rietschote | |
| 7,240,179 B1* | 7/2007 | Treichler et al. .............. | 711/203 |
| 7,287,107 B2* | 10/2007 | Noonan et al. ................. | 710/60 |
| 7,725,608 B2 | 5/2010 | Diamant | |
| 7,802,095 B2* | 9/2010 | Risan et al. ................... | 713/164 |
| 2002/0023179 A1* | 2/2002 | Stanley ......................... | 710/8 |
| 2002/0049778 A1 | 4/2002 | Bell et al. | |
| 2002/0049883 A1* | 4/2002 | Schneider et al. ........... | 711/100 |
| 2003/0061401 A1 | 3/2003 | Luciani, Jr. | |
| 2003/0191623 A1 | 10/2003 | Salmonsen | |
| 2004/0186837 A1* | 9/2004 | Lambert et al. ................ | 707/10 |
| 2005/0091221 A1* | 4/2005 | Harris et al. ................... | 707/10 |
| 2005/0149759 A1* | 7/2005 | Vishwanath et al. ......... | 713/201 |
| 2005/0172309 A1* | 8/2005 | Risan et al. ..................... | 725/1 |
| 2005/0289218 A1 | 12/2005 | Rothman et al. | |
| 2006/0143362 A1* | 6/2006 | Li et al. ......................... | 711/100 |
| 2006/0230454 A1* | 10/2006 | Achanta et al. ................ | 726/24 |
| 2008/0195902 A1* | 8/2008 | Astigarraga et al. .......... | 714/720 |

(Continued)

OTHER PUBLICATIONS

Office Action received for U.S. Appl. No. 11/174,406, mailed on Oct. 2, 2007, 14 Pages.

(Continued)

Primary Examiner — Henry Tsai
Assistant Examiner — Michael Sun
(74) Attorney, Agent, or Firm — Christopher K. Gagne

(57) ABSTRACT

Device images, for example IDE mass storage device images, may be enabled and disabled without disrupting a host system. In one embodiment, the invention includes a memory device register to indicate the presence of a memory device to a computer system, a switch coupled to the memory device register to set the memory device register to indicate the presence of a memory device, and an external interface coupled to the switch to operate the switch.

18 Claims, 5 Drawing Sheets

U.S. PATENT DOCUMENTS

2010/0023541 A1*   1/2010   Cosic .......................... 707/101

OTHER PUBLICATIONS

Response to Office Action received for U.S. Appl. No. 11/174,406, filed Jan. 7, 2008, 10 Pages.
Office Action received for U.S. Appl. No. 11/174,406, mailed on Apr. 29, 2008, 22 Pages.
Office Action received for U.S. Appl. No. 11/174,406, mailed on Oct. 2, 2008, 15 Pages.
Office Action received for U.S. Appl. No. 11/174,406, mailed on Mar. 16, 2009, 15 Pages.
Response to Office Action received for U.S. Appl. No. 11/174,406, filed Jul. 15, 2008, 10 Pages.
Response to Office Action received for U.S. Appl. No. 11/174,406, filed Jan. 2, 2009, 16 Pages.
Response to Office Action received for U.S. Appl. No. 11/174,406, filed Sep. 30, 2009, 14 Pages.
Notice of Allowance received for U.S. Appl. No. 11/174,406, Feb. 2, 2010, 8 Pages.
Response to Office Action received for U.S. Appl. No. 11/174,406, filed Jun. 16, 2009, 14 Pages.
Office Action received for U.S. Appl. No. 11/174,406, mailed on Sep. 15, 2009, 15 Pages.

* cited by examiner

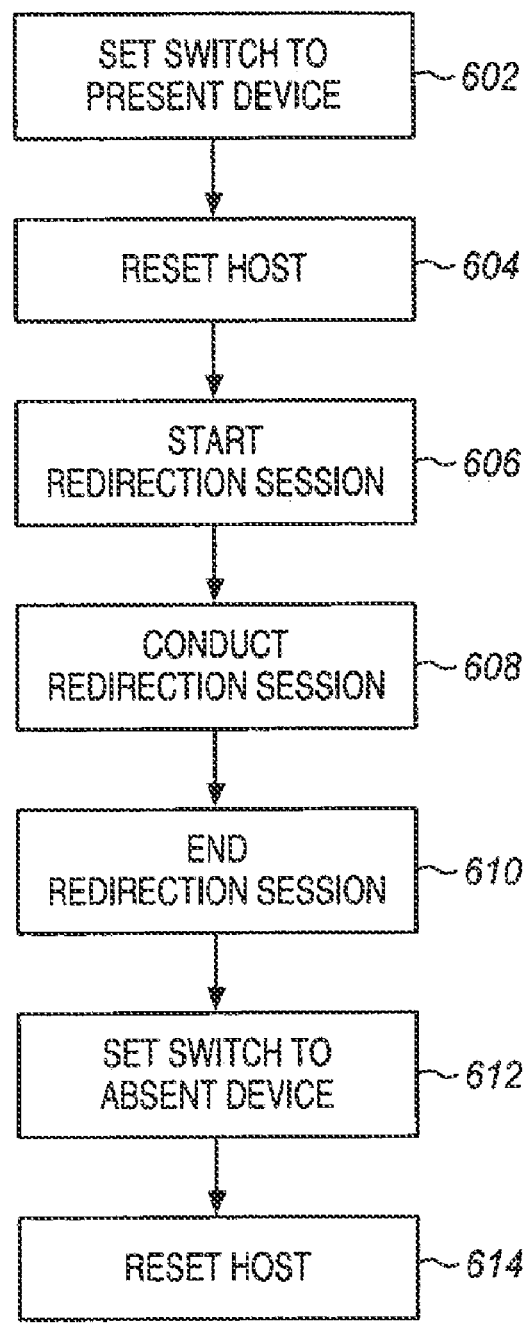

ENABLING AND DISABLING DEVICE IMAGES ON A PLATFORM WITHOUT DISRUPTING BIOS OR OS

CROSS REFERENCE TO RELATED APPLICATIONS

This application is a continuation of prior co-pending U.S. patent application Ser. No. 11/174,406, entitled "Enabling and Disabling Device Images on a Platform without Disrupting BIOS or OS" filed on Jun. 30, 2005.

FIELD

The present description relates to computing systems that can operate with a local or remote mass storage device, and in particular to allowing the mass storage devices to be revealed and concealed from the computing system.

BACKGROUND

The costs of maintaining and repairing computers can be significant. One significant factor is the time required for IT (information technology) personnel to individually maintain the operability and currency of each computer. These costs can be reduced significantly by tools that permit the IT personnel to perform maintenance and repairs remotely. For example, in a situation in which a given computer must have an operating system installed, an application installed or software updated, it is inconvenient for IT personnel to physically travel to the particular computer in order to perform the installation. Tools that permit the installation of the operating system by delivering the operating system or other software across a network may eliminate the need for the IT personnel to travel, and therefore reduce costs.

Some BIOS (basic input/output systems), support a feature whereby a LAN controller may be used to access a remote boot server. Executable code is downloaded from the remote boot server, and is then run by the system. Just prior to running the downloaded executable code, the connection to the remote server is closed by the BIOS. However, closing the connection prevents the system from obtaining any further files or data from the network unless a networking stack is loaded first.

BRIEF DESCRIPTION OF THE DRAWINGS

The various advantages of the embodiments of the present invention will become apparent to one skilled in the art by reading the following specification and appended claims, and by referencing the following drawings.

FIG. 6 depicts a flow of operations that may be enacted using a virtual IDE hardware switch, according to an embodiment of the present invention.

DETAILED DESCRIPTION

As used herein, the term "integrated device electronics (IDE) device" refers to an Advanced Technology Attachment (ATA) device, and the terms may be used interchangeably. The specifications governing these devices are promulgated by the International Committee on Information Technology Standards (INCITS), which operates under the American National Standards Institute (ANSI). The specifications include ANSI NCITS 317-1998 AT Attachment—4 with Packet Interface Extension, ANSI NCITS 340-2000 AT Attachment—5 with Packet Interface, and ANSI NCITS 361-2002 AT Attachment—6 with Packet Interface. Therefore, the term "IDE device" or "ATA device" refers to any device behaving in accordance with these specifications or any such similar specification promulgated in the past and in the future, including Ultra ATA and Serial ATA.

Figure 1:
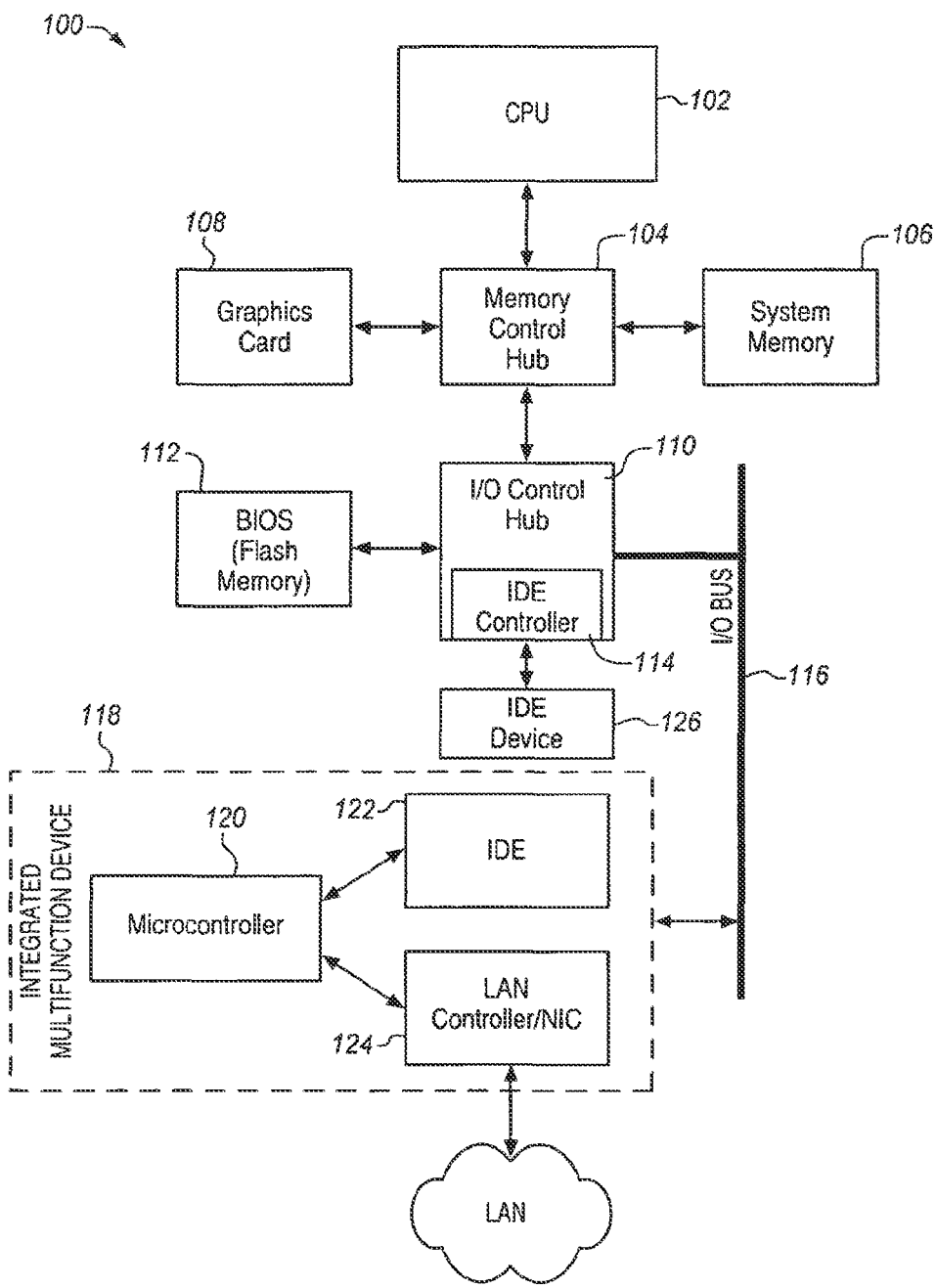
FIG. 1 depicts a computing system that employs a virtual IDE interface, according to an embodiment of the present invention.

FIG. 1 depicts one example of a computing system 100 that redirects device commands and data to a network, without rooting the source of the redirection in the system BIOS. As can be seen from FIG. 1, the computing system 100 includes a CPU 102, which is coupled to a MCH memory control hub (MCH) 104. The memory control hub 104 is an arrangement of circuitry that manages and controls access to a system memory 106, a graphics card 108, and an input/output (I/O) control hub (ICH) 110. The I/O control hub 110, in turn, manages and controls access to a flash memory device 112, which stores the BIOS. In one embodiment, it manages and controls access to an IDE controller 114, which is embodied as a part of the I/O control hub 110.

An IDE device 126 is coupled to the controller 114. The IDE device 126 communicates data to and from the host via the controller 114. In another embodiment, the I/O control hub 110 also manages and controls access to an I/O bus 116, such as a PCI (Peripheral Component Interconnect) bus. (In an embodiment, the I/O control hub 110 also manages and controls access to audio channels, USB ports, and other I/O devices that are known in the art, but are not important in the context of this disclosure, and are not depicted herein). In the example of FIG. 1, the CPU, MCH, ICH, graphics card and BIOS are shown as separate elements, however any one or more these may be combined. For example, the graphics card may be in the form of a single chip or it may be combined with the MCH. The MCH or ICH may be combined in whole or in part with the CPU or each other. The architecture of FIG. 1 is provided only as an example.

Coupled to the I/O bus 116 is an integrated multifunction device 118. As discussed in more detail below, an integrated multifunction device 118 may be a single device that provides more than one function. In the particular example depicted in FIG. 2, the integrated multifunction device 118 is a single device that offers an IDE device function and a LAN controller function. Such an integrated multifunction device 118 may be presented in the marketplace as a LAN controller with built-in manageability features.

The integrated multifunction device 118 may include a microcontroller 120 coupled to a virtual IDE interface 122 (discussed below) and a LAN controller 124. The virtual IDE interface may present a set of registers appearing in size, number, and behavior as belonging to an IDE device and IDE controller, when in fact no such device exists. The just-mentioned registers serve as an interface between the virtual IDE functionality provided by the integrated multifunction device 118 and software running on the CPU 102. In other words, data is read from and written to the IDE function by reading from and writing to the registers. Further, the behavior of the IDE function is controlled by writing to and reading from the registers in a manner to mimic the behavior of an IDE device.

As discussed in greater detail below, the integrated multifunction device 118 may be accessed in a manner identical to that of an IDE device. The device 118 receives commands, and forwards the commands via a network to a remote computer that interprets the commands and accesses a data set, in response to the commands. For example, the device 118 may receive a command to read a given disc sector. The device 118 forwards the command, via the network, to a remote computer. The remote computer accesses a data set to find the information that would have been found had the disc sector been read by a physically present device. The data is returned to the device 118 via the network. The device 118 returns the data to the host via the virtual IDE interface 122.

In one embodiment, the computer system 100 does not have a physical drive present. In other words, IDE device 126 is absent, as might be the case in the context of a network computer. All drive access commands are routed through the device 118 to the aforementioned remote computer. In another embodiment, the computer system 100 has a physical drive, such as IDE device 126 present, as shown in FIG. 1 and the virtual IDE device, that appears as if it was attached to the virtual IDE controller 122, functions as a second drive. The virtual IDE device may be designated as the primary or secondary drive.

Figure 2:
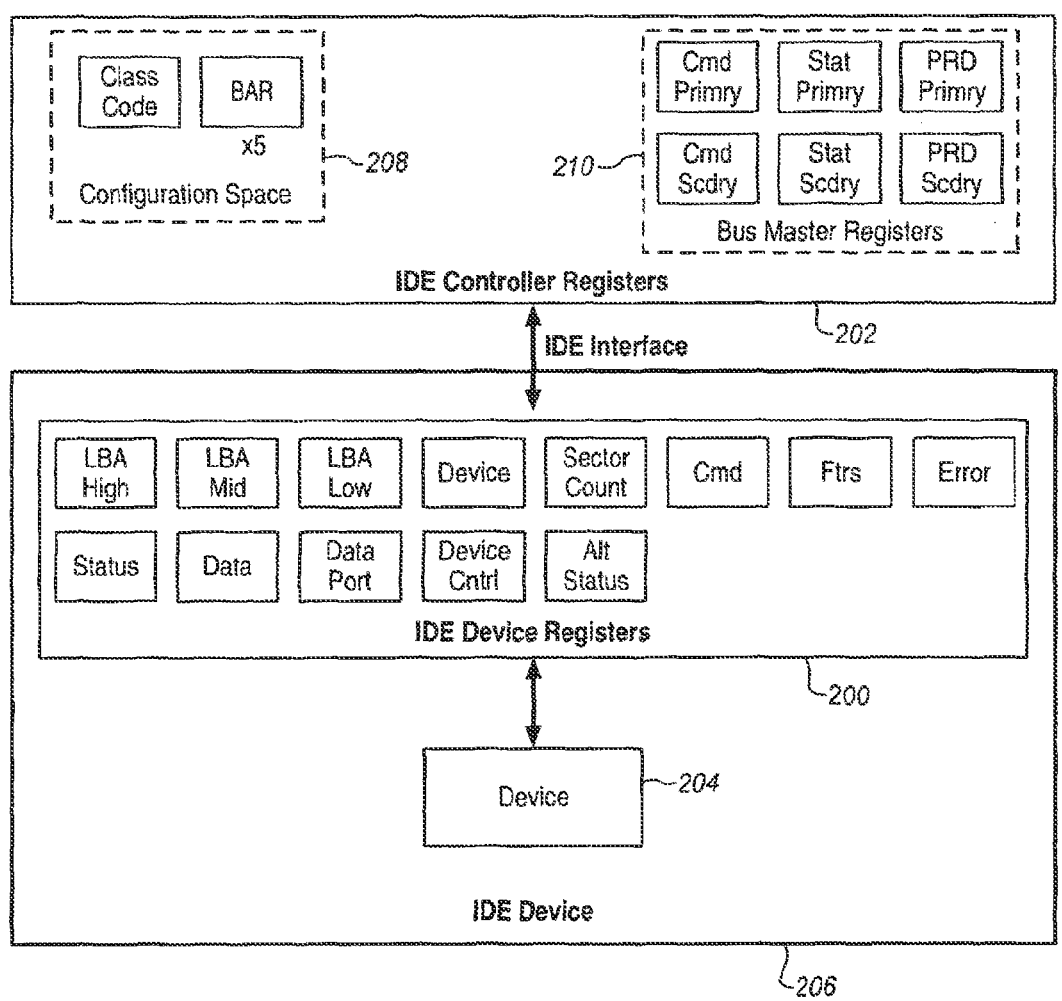
FIG. 2 depicts a disc device having an IDE interface, as is known in the prior art.

Shown in FIG. 2, is a set of IDE device registers 200 associated with a real IDE device 206 that is attached to real IDE controller 202 as those are currently defined in the standards. The set of IDE device registers 200, and the IDE device 204 are contained within a housing 206. The set of IDE device registers includes: (1) the logical block address—high register (LBA High); (2) the logical block address—mid register (LBA Mid); (3) the logical block address—low register (LBA Low); (4) the device register; (5) the sector count register; (6) the command register (Cmd); (7) the features register (Ftrs); (8) the error register; (9) the status register; (10) the data register; (11) the data port; (12) the device control register (Device Cntrl); and (13) the alternate status register (Alt Status). The uses and purposes of the above-mentioned registers are known for IDE devices, and are described by the ANSI standards mentioned above. Briefly, the command register is used to instruct the device to perform a particular operation. The use of the remainder of the registers may be command-specific (or device-specific).

The set of IDE controller registers 202 includes the configuration space registers 208 and the bus master registers 210. The bus master registers may be used for direct memory access (DMA) read and write operations. For the general orientation of the reader, the uses and purposes of the bus master registers 210 are briefly described below. As can be seen from FIG. 2, the bus master registers 210 contain two sets of three registers (additional non-standard registers may also be included, but are not depicted). One set corresponds to a primary IDE cable; the other, to the secondary IDE cable. Each set contains a Bus Master Command register (Cmd Primry and Cmd Scdry). These registers control the bus master operation, and determine whether the operation is a DMA read or a write. They may also start and stop the bus operation. Each set also contains a Bus Master IDE Status register (Stat Primry and Stat Scdry). These registers reveal whether bus master DMA is active, and also contain an interrupt report status bit. Further, each set also contains a Bus Master IDE PRD Table Address register (PRD Primry and PRD Scdry). These registers contain a pointer to a descriptor table. Each descriptor points to an area of host memory to or from which data is to be written or read. In the context of a READ SECTORS command, the CPU (not depicted in FIG. 2) indicates the starting logical block of the sectors to be read in the LBA Low, LBA Mid, and LBA High registers, indicates the number of sectors to be read in the sector count register, and indicates which device the command is directed toward (i.e., master or slave) with the device register. After having loaded the appropriate values in the above-mentioned registers, the command register is written to, in order to indicate that the READ SECTORS command is to be performed by the IDE device 204.

After the command register is written with the appropriate command code, the command is executed, the device is indicated as busy, and the data is prepared. When the data is ready to be read from the data register, the status register indicates that the device is not busy, and the data request bit therein is asserted. The host (i.e., the computer to which the device is attached) responds by obtaining the data from the device, by virtue of a series of reads from the data register. The data is transferred to the host in blocks, and a series of state transitions occur in both the host and the IDE controller 202 and IDE device 204 to permit the transfer to take place. The details of the state transitions are known in the art and are beyond the scope of this disclosure.

Figure 3:
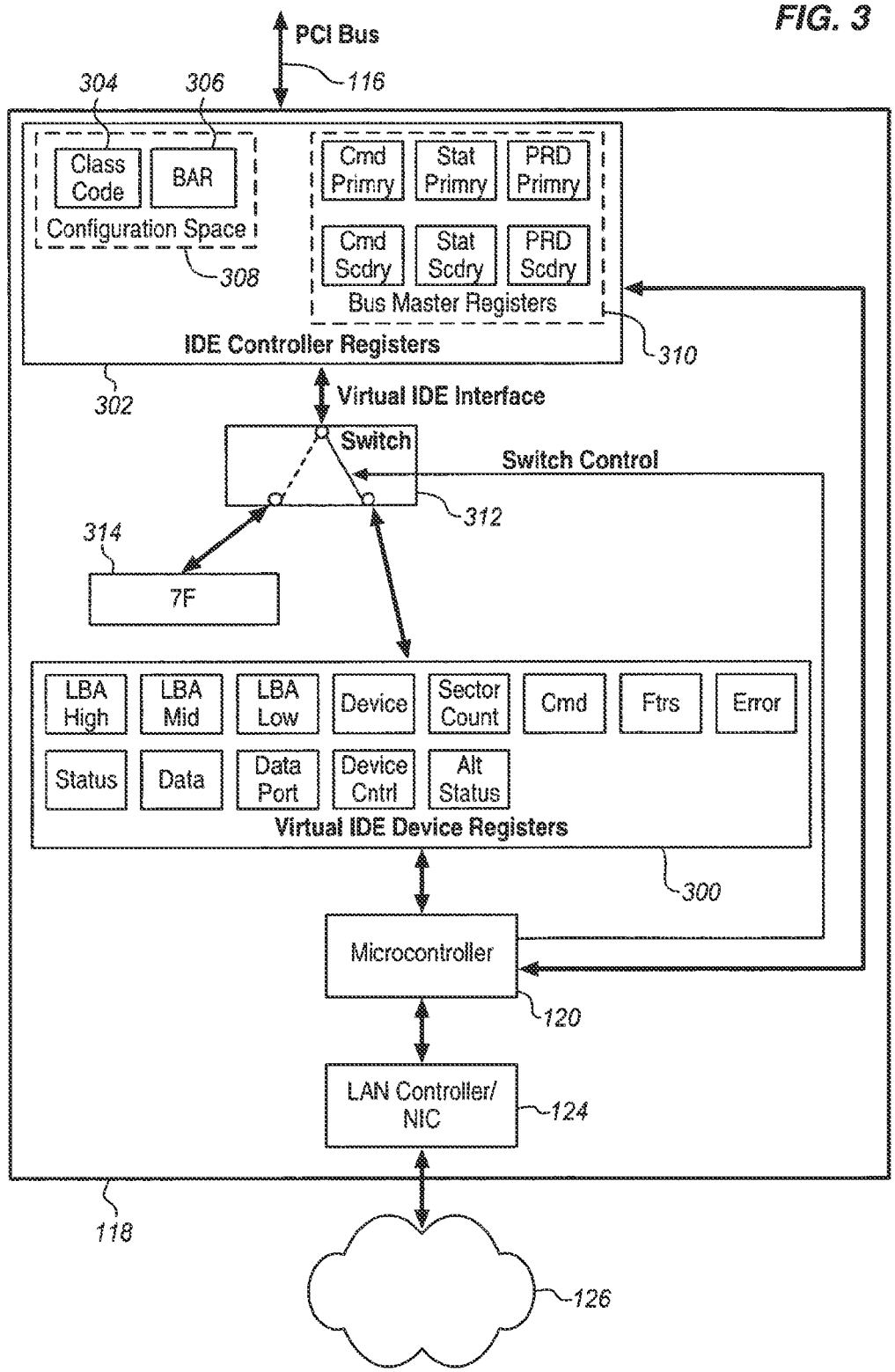
FIG. 3 depicts an integrated multifunction device, including a virtual IDE interface, according to an embodiment of the present invention.

FIG. 3 depicts an example of the integrated multifunction device 118 in greater detail, including a set of virtual IDE device registers 300 and a set of virtual IDE controller registers 302. As can be seen, the microcontroller 120 residing on the integrated multifunction device 118 is coupled to a set of virtual IDE device registers 300. The set of virtual IDE device registers are similar to the real IDE device registers described above with reference to FIG. 2.

The set of virtual IDE controller registers 302 includes the configuration space registers 308 and the bus master registers 310, similar to the controller registers of FIG. 2. As suggested by the name, the virtual IDE controller registers 302 may be dimensioned in size and quantity to be identical to the registers ordinarily found in a standard IDE controller (like the one identified by reference numeral 114 in FIG. 1, embodied in the I/O control hub 110). The bus master registers may be used for direct memory access (DMA) read and write operations.

As stated above, the microcontroller 120 executes firmware or software stored in a memory device (not depicted), which causes the microcontroller 120 to read from and write to the registers 300 and 310 as though the integrated multifunction device 118 actually was an IDE controller with an IDE device or IDE devices coupled thereto. The examples provided regarding reading and writing to the registers are intended to provide a flavor of the manner in which the microcontroller 120 can read from and write to the registers 300 and 310 to emulate the behavior of an actual IDE controller with an actual IDE device coupled thereto, from the vantage of the CPU 102.

Returning to FIG. 3, therein is depicted a set of virtual IDE device registers 300. By this, it is meant that although the set of IDE device registers 300 exists, there exists no IDE device associated therewith. From the vantage of the CPU 102, however, it is not apparent that no actual IDE device exists. The microcontroller 320 may read from and write to the set of virtual IDE device registers 300 and bus master registers 310 in a manner mimicking that of a real IDE controller with a real IDE device coupled thereto (i.e., the arrangement of FIG. 2). Thus, for example, when the host requests a READ SECTORS command to be executed by the virtual IDE device, it may do so in the same way that it requested a READ SECTORS command to be executed by a read IDE device. Specifically, the host indicates the starting logical block of the sectors to be read in the LBA Low, LBA Mid, and LBA High registers, indicates the number of sectors to be read in the sector count register, and indicates which device the command is directed toward (i.e., master or slave) with the device register. After having loaded the appropriate values in the above-mentioned registers, the host writes the command code indicating the READ SECTORS command to the command register. In the wake of writing to the command register, hardware sets the device busy bit in the status register and alternate status register, and the microcontroller 320 reads the set of virtual IDE device registers 300 (alternatively, the device busy bit in the status register may be set by the microcontroller 320, upon the command register being written to).

Thereafter, the microcontroller 320 may communicate the READ SECTORS command via a network controller 324 and network to a management console (discussed in further detail, below). The management console may receive the READ SECTORS command, interpret the command, prepare the data based upon image data stored at the management console, and return the data to the microcontroller 320. When the data is received by the microcontroller 320 and is ready to be read from the data register in the virtual IDE interface 300, the microcontroller 320 writes to the status register to indicate that the device is not busy, and asserts the data request bit therein.

The host responds by obtaining the data from the device, by virtue of a series of reads from the data register. Again, the data is transferred to the host in blocks, and the microcontroller 320 controls the registers of the virtual interface 300, so as to cause the host to traverse the same series of state transitions it would traverse, if a real IDE device were coupled to the virtual set of IDE device registers 300 and were transferring the data to the host. Thus, from the vantage of the CPU 102, the virtual set of IDE registers 300 and bus master registers 310 may be used in an identical manner to that of a real IDE controller with a real IDE device coupled thereto.

One advantage of employment of a set of virtual IDE device registers and bus master registers is that the redirective capacity of the computing system employing such registers does not hinge upon the design of the BIOS or operating system. Instead, the redirective capacity of the system results from the ability of a device having access to a network to present a set of registers to the CPU that is indistinguishable from a real IDE controller and device. Therefore, a redirection scheme employing a set of virtual IDE device registers (such as registers 300) and bus master registers (such as registers 310) can be used to install an operating system, among other uses.

Returning to FIG. 3 and a discussion of the structure of the integrated multifunction device 318, the integrated multifunction device 318 may also include a LAN controller 324. The LAN controller 324 includes a set of registers through which the CPU 102 interfaces with the LAN controller 324 functionality. Of course, the LAN controller 324 also includes circuitry to perform low-level functionality including interfacing with the physical communication medium. The integrated multifunction device 318 may embodied as a single chip, or may be embodied as multiple chips that cooperate with one another.

A set of virtual IDE device registers may be made available to a CPU 102 by providing a configuration space that announces the presence of an IDE interface function in a device. For example, if the integrated multifunction device 318 is a PCI compatible device, then it may include a PCI configuration space 308, which is a set of registers including a class code register 304 and 5 base address registers (BARs) 306. The class code register 304 contains a value identifying the sort of function provided by the device. Thus, in the context of a device providing a virtual IDE device (or an ordinary IDE device), the class code register 304 contains a value identifying an IDE interface function. The base address registers 306 are provided in the configuration space 308 so that the BIOS may store therein I/O addresses pointing to the set of virtual IDE device registers 300 (or one or more registers therein).

During startup, the BIOS traverses each I/O bus (such as PCI bus 316) and seeks out each device. Each device found is enumerated. Furthermore, the BIOS seeks out each function offered by each device. Each function of each device is also enumerated. During this process, the BIOS stores an I/O address in each of the base address registers of the configuration space associated with each function of each device. Based on the I/O addresses stored in the base address registers, the BIOS can determine how to address a particular function on a particular device.

FIG. 3 further shows a switch, for example a hardware switch 312 between the virtual IDE Controller Registers 302 and the virtual IDE Device Registers 300. The switch allows any access through the external interface 316 to be either to the virtual IDE Device Registers 300 or to a disconnection register 314. The connection through the virtual IDE Device Registers allows the multifunction device to emulate an IDE device as described above. The disconnection register allows the multifunction device to emulate an IDE controller which has no device connected, e.g. an unpopulated cable.

In one embodiment, when the switch is in the disconnected position, the value of the disconnection register is returned upon CPU 102 read from the address of any of the virtual IDE device registers 300 to indicate that there is no IDE device coupled to the virtual IDE controller 302. Under current IDE standards this may be done by reading hexadecimal value 7 F from the I/O addresses pointed by the IDE controller 302 configuration space 308 BARs 306 that point to the IDE device registers. As shown in FIG. 3, the switch is controlled by the device microcontroller 320 which receives instructions from the management console through the LAN controller, but it may be controlled in other ways as described in more detail below. The switch 312 may be connected to the IDE controller directly or to any particular IDE device registers. The switch may be coupled to the master or slave connection on either the primary or the secondary cable or to any combination of device connections. There may be one switch or more, depending on the application.

In the examples of FIGS. 1 and 3, the registers of the virtual IDE device are shown as being contained on an independent device coupled to the managed system through an I/O bus, such as a PCI bus. While embodiments of the present invention may be implemented in a LAN interface PCI adapter card, there are other possible implementations. Different I/O buses and adapter card interfaces may be used, for example PCI Express, PCI-X, USB and Infiniband as well as specific storage device buses such as IDE, ATAPI (Advanced Technology Attachment Packet Interface), SCSI (Small Computer System Interface) and others.

Rather than being resident on a separate adapter card, the integrated multifunction device may be integrated into the computer system as one or more components or chips on the motherboard, or as a part of an MCH or ICH, a bus interface or bus adapter or another component. The switch 419 may be implemented separately from the LAN controller and not necessarily related to it. The switch may alternatively be connected between the real IDE controller 114 and the real IDE devices or devices 126. The switch may be controlled by the CPU 42 or by any other mechanism that will hide or unhide one or more physical IDE (or SCSI or other) devices, as shown in FIG. 5.

Figure 4:
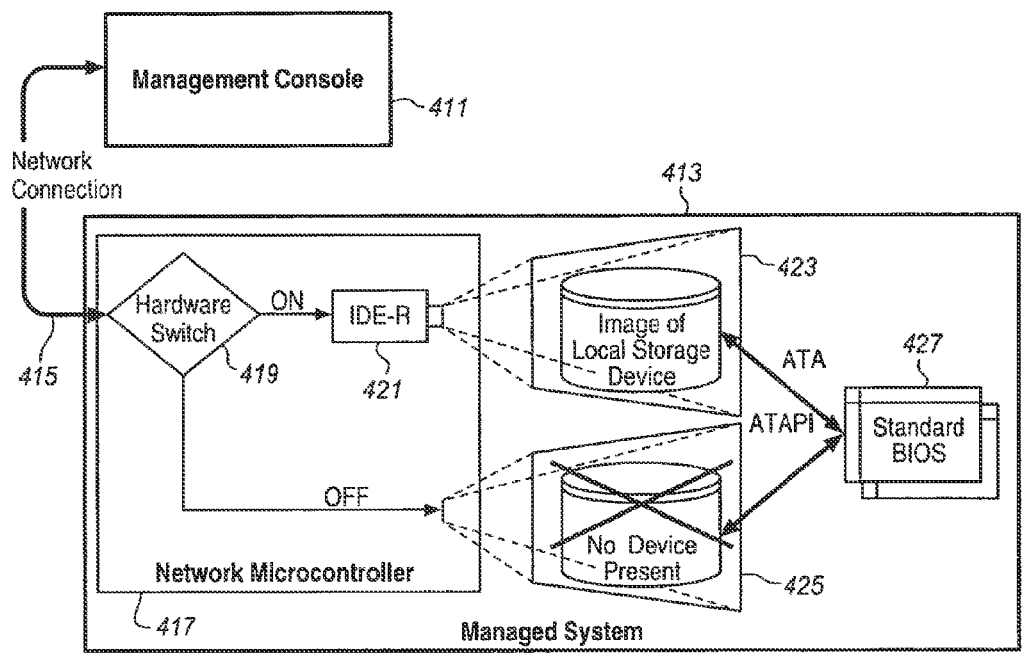
FIG. 4 depicts a diagrammatic view of a switched virtual IDE device in a managed system, according to an embodiment of the present invention.
Figure 5:
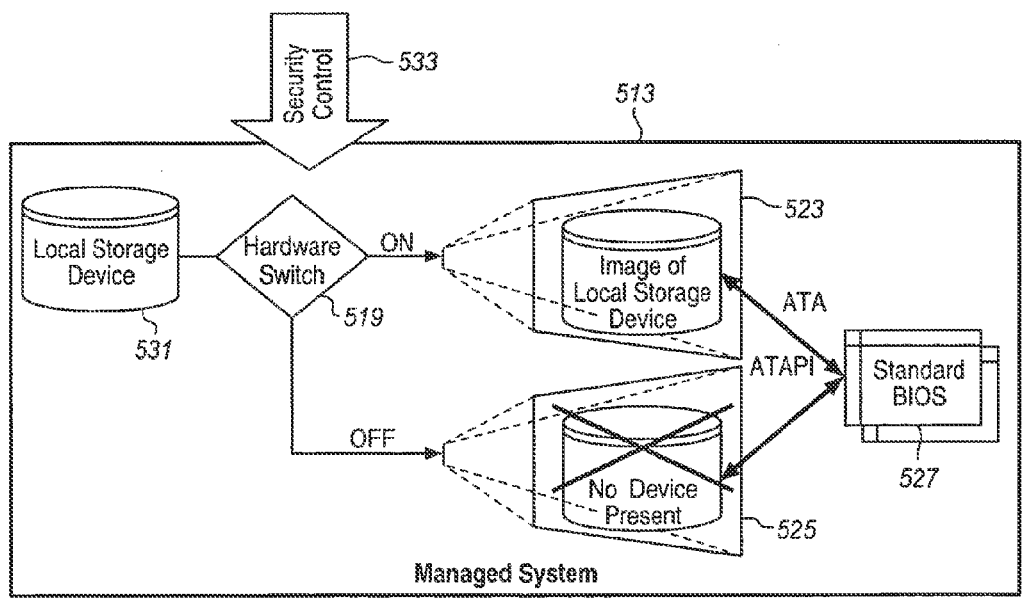
FIG. 5 depicts a diagrammatic view of an alternative switched virtual IDE device in a managed system, according to an embodiment of the present invention.

FIGS. 4 and 5 show a diagrammatic view of a switch that may be added to the managed system. The switch may be the same as the switch 312 of FIG. 3 or it may be implemented in another way. In one embodiment, the switch is part of the integrated multifunction device of FIG. 1 as shown in FIGS. 3, 4 and 5. The switch may be controlled by anything that has access to the multifunction device, such as the PCI bus or the network connector. Alternatively, the switch may operate independent of LAN and bus controllers and be implemented inside firmware with direct access to the virtual IDE registers. In one such example, the switch is integrated into the microcontroller of FIGS. 1 and 3. In another embodiment, the switch is a separate hardware device with specific connectors that may be operated by the microcontroller, by the LAN controller or even manually.

Access to the switch may be provided in a variety of different ways, including a PCI bus (the I/O Bus in FIG. 1), a LAN connection or through a separate connector. Through any appropriate connection, the switch may be controlled by one or more different entities. The BIOS may operate the switch through any connected system bus. Software controlled by the remote console may operate the switch either directly or through an intermediary. Firmware in the virtual IDE system may operate the switch and may act as an intermediary for the remote console. Alternatively, a user accessible mechanical or electronic switch may be provided so that a user or other authorized person may operate the switch manually. Such a switch may be concealed or locked behind a panel to provide security for a mass storage device.

Using the hardware switch, a remote storage device can be effectively connected and disconnected from the managed system. When the switch is "on" the virtual IDE registers are set to the desired type of virtual device, such as a hard disk drive, an optical disk drive, a boot floppy disk drive etc. When the switch is "off", the virtual IDE registers are set to a state corresponding to a disconnected or unpopulated cable. Under current IDE standards, a disconnected cable can be represented by setting the eight IDE device register values to hexadecimal number 7 F, for example.

On startup or reset for many computer system architectures, the BIOS will search for devices. When reading the virtual IDE drive registers, it will then configure the system based on the presence or absence of an IDE device as indicated by the registers. The registers also indicate the type of the device, such as a mass storage device like a hard disk drive or optical drive. If the virtual IDE registers indicate that an IDE device is connected, then in many systems this device will show up as active working hardware to a system user. For example, it may have an icon associated with it in the file management interface to indicate the nature of the device.

If the virtual remote IDE device or drive is controlled from a remote console, then the virtual drive my not correspond to any particular image files or storage devices at the remote console. This may occur for example because the connection to the remote console is disconnected, because the virtual drive is not mapped to a specific image file, because the mapped files have restricted access, or because the mapped storage device at the management console has no media inside. As a result, some users may perceive the presence of the virtual drive that cannot be accessed or that has no files as an error, a distraction, or a nuisance. The remote console operator, using the hardware switch can make the virtual drive appear to the system when needed and disappear, or appear to be disconnected when it is no longer needed. This avoids any distraction, confusion or annoyance for the user.

When the switch is used to connect and disconnect a virtual drive, the same system risks may arise as with a real IDE device. Mass storage devices on an internal bus like IDE cannot safely be removed or connected while the host system is running. Accordingly, safeguards may be added to protect the system from connecting or disconnecting the virtual IDE device at the wrong time. One safeguard is to prevent operation of the switch while the virtual IDE device is in use. Another safeguard is to synchronize changes in the switch to a reset of the I/O bus or a reset of the system from BIOS.

In one example, when the remote console wants to add a virtual IDE device to a managed system, it sends a command to the multifunction device over the network interface to add the virtual IDE device and then it sends a command to reset or restart the system. These commands may be combined depending on the protocol in use with the microcontroller on the multifunction device. The new virtual IDE device will be discovered by the BIOS after the reset and be ready for use. Similarly when the remote console is finished with the virtual IDE device, a command may be sent to disable the hardware switch and then to perform a system reset or restart so that the system configuration is changed.

Two different possible states of the managed system are shown in FIG. 4. In the example of FIG. 4, the remote console 411 is coupled to the managed system 413 using a local area or wide area network connection of any of a variety of different types. This may include Ethernet, modems, or any of a variety of wireless network connections. Alternatively, any other type of connections may be used that have sufficient bandwidth to emulate an IDE device. As a further alternative, multiple connections may be used, one to control the switch and another to provide communications for the virtual IDE device.

In the example of FIG. 4, the network connection is coupled to a network microcontroller 417. The microcontroller may be a part of the integrated multifunction device 118 of FIG. 1. The network microcontroller includes a hardware switch 419 and IDE registers such as those shown in FIG. 3. The network microcontroller controls the hardware switch and the hardware switch controls the presence of the virtual IDE device that is emulated by the remote console. When the switch is on, an IDE device 421 appears to the managed system as an image of a local storage device 423. This image is discovered by the BIOS 427 or by the OS during a system reset or restart. When the switch is off, there is no device image 425 presented to the BIOS or to the OS. While the virtual device is shown as being in communication with and being discovered by the BIOS, in a different managed system architecture, there may be no BIOS or some other aspect of the system may track and inventory system resources.

Another application for the hardware switch is shown in FIG. 5. In the example of FIG. 5, a real IDE device may be connected or disconnected through a hardware switch. The managed system 513 includes a hardware switch 519 similar to the hardware switch 419 of FIG. 4. The switch is coupled to IDE controller registers such as those shown in FIGS. 2 and 3 to allow an image of an IDE device 423 to appear to the system BIOS 427 or to the OS. By moving the switch to off, this image may be made to disappear 525 as in FIG. 4 and the device is not accessible. However, in FIG. 5, the IDE registers correspond to a real IDE device 531, such as a local hard disk drive, optical disk drive, flash memory drive, or other IDE device. When the switch is disabled, the real IDE registers are not accessible and in one embodiment, can not be changed even if the IDE device remains connected to the corresponding IDE bus. A separate external interface 533 operates the switch.

The separate external interface may be controlled by an authorized administrator or even an authorized user. The switch may be operated by a command from the remote console or it may be restricted to local operation using, for example, a password, a physical key or a restricted access BIOS or OS operation.

The hardware switch of FIG. 5 allows actual local storage devices to be made visible or invisible to the managed system. This may allow sensitive data to be protected from unauthorized users, regardless of the type of data. Some examples of sensitive data are business, financial, personal or technical information or material that is not considered suitable for children. The switch may also be used to control the use of IDE (or SCSI or USB) devices that accept removable media, such as floppy disks, optical disks, and high capacity magnetic tapes and disks. The switch may be set to prevent users from using the disk or tape drives of a managed system to add unauthorized software from floppy disks, or CDs and to prevent the user from using these drives to make copies of system data.

FIG. 6 shows an example process that may be performed using the configurations described above. In FIG. 6 a host device, such as the managed system of FIG. 1 or FIGS. 4 and 5, is coupled to a management console, such as management console 411, or is being operated by an administrator. At block 602, the management console or administrator starts a redirection session. The host device includes a switch 312, 419, 519. The switch is operated at block 604 to indicate that a device is present such as a virtual or real IDE device. At block 606, the host device is reset so that it recognizes the real or virtual device. At block 608, the redirection session is conducted. In the example of FIG. 4, this may allow for maintenance or repairs to be made. In the example of FIG. 5, this may, for example, allow for memory with restricted access to be used.

After the redirection session has been conducted, at block 610, the switch is set so that it indicates the absence of the device. The host may then be reset, so that the hardware change is recognized at block 612. It should be noted that in some implementations the switch can change its polarity in a way that is not synchronized to the platform reset or to the PCI bus reset. After the host device is reset, the redirection session may be ended at block 614 in any of a variety of different ways.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, and others.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

What is claimed is:

1. An apparatus comprising:
    a first device to selectively hide and unhide appearance of a second device to a system, the first device selectively hiding and unhiding the appearance of the second device based upon control provided to the first device from a management console;
    the appearance of the second device being indicated, when the appearance of the second device is unhidden, by an icon associated with second device in a management interface of the system; and
    when the appearance of the second device is hidden, the second device being undetected by the system;
    the management console being to initiate a redirection session involving the system and the second device, the redirection session to permit repair to be made and restricted access memory to be used;
    the first device to control, by the hiding and unhiding of the appearance of the second device, use of a removable media device of the system to prevent unauthorized adding of software to the system via the removable media device and to prevent copying of system data using the removable media device.

2. The apparatus of claim 1, wherein:
    the first device comprises a microcontroller to be coupled to the management console via a network connection, the microcontroller being remote from the management console.

3. The apparatus of claim 2, wherein:
    the second device comprises a real storage device;
    the system comprises an operating system to discover the real storage device when the appearance of the second device is unhidden, the operating system being prevented from discovering the real storage device when the appearance of the second device is hidden; and
    the real storage device is local to a managed system that comprises the microcontroller.

4. The apparatus of claim 2, wherein:
    the second device comprises an actual storage device;
    the system comprises a basic input/output system to discover the actual storage device when the appearance of the second device is unhidden, the basic input/output system being prevented from discovering the actual storage device when the appearance of the second device is hidden; and
    the actual storage device is local to a managed system that comprises the microcontroller.

5. The apparatus of claim 1, wherein:
    the second device comprises a virtual device; and
    the management console is to initiate a redirection session involving the virtual device when the virtual device is unhidden.

6. The apparatus of claim 1, wherein:
    the second device is hidden and unhidden to prevent and permit, respectively, sensitive data to be accessed.

7. A machine readable memory storing instructions that when executed by a machine result in operations comprising:
    selectively hiding and unhiding by a first device appearance of a second device to a system, the hiding and the unhiding being based upon control provided to the first device from a management console;
    the appearance of the second device being indicated, when the appearance of the second device is unhidden, by an icon associated with second device in a management interface of the system; and when the appearance of the second device is hidden, the second device being undetected by the system;

the management console being to initiate a redirection session involving the system and the second device, the redirection session to permit repair to be made and restricted access memory to be used;

the first device to control, by the hiding and unhiding of the appearance of the second device, use of a removable media device of the system to prevent unauthorized adding of software to the system via the removable media device and to prevent copying of system data using the removable media device.

8. The memory of claim 7, wherein:
the first device comprises a microcontroller to be coupled to the management console via a network connection, the microcontroller being remote from the management console.

9. The memory of claim 8, wherein:
the second device comprises a real storage device;
the system comprises an operating system to discover the real storage device when the appearance of the second device is unhidden, the operating system being prevented from discovering the real storage device when the appearance of the second device is hidden; and
the real storage device is local to a managed system that comprises the microcontroller.

10. The memory of claim 8, wherein:
the second device comprises an actual storage device;
the system comprises a basic input/output system to discover the actual storage device when the appearance of the second device is unhidden, the basic input/output system being prevented from discovering the actual storage device when the appearance of the second device is hidden; and
the actual storage device is local to a managed system that comprises the microcontroller.

11. The memory of claim 7, wherein:
the second device comprises a virtual device; and
the management console is to initiate a redirection session involving the virtual device when the virtual device is unhidden.

12. The memory of claim 7, wherein:
the second device is hidden and unhidden to prevent and permit, respectively, sensitive data to be accessed.

13. A method comprising:
selectively hiding and unhiding by a first device appearance of a second device to a system, the hiding and the unhiding being based upon control provided to the first device from a management console;

the appearance of the second device being indicated, when the appearance of the second device is unhidden, by an icon associated with second device in a management interface of the system; and when the appearance of the second device is hidden, the second device being undetected by the system;

the management console being to initiate a redirection session involving the system and the second device, the redirection session to permit repair to be made and restricted access memory to be used;

the first device to control, by the hiding and unhiding of the appearance of the second device, use of a removable media device of the system to prevent unauthorized adding of software to the system via the removable media device and to prevent copying of system data using the removable media device.

14. The method of claim 13, wherein:
the first device comprises a microcontroller to be coupled to the management console via a network connection, the microcontroller being remote from the management console.

15. The method of claim 14, wherein:
the second device comprises a real storage device;
the system comprises an operating system to discover the real storage device when the appearance of the second device is unhidden, the operating system being prevented from discovering the real storage device when the appearance of the second device is hidden; and
the real storage device is local to a managed system that comprises the microcontroller.

16. The method of claim 14, wherein:
the second device comprises an actual storage device;
the system comprises a basic input/output system to discover the actual storage device when the appearance of the second device is unhidden, the basic input/output system being prevented from discovering the actual storage device when the appearance of the second device is hidden; and
the actual storage device is local to a managed system that comprises the microcontroller.

17. The method of claim 14, wherein:
the second device comprises a virtual device; and
the management console is to initiate a redirection session involving the virtual device when the virtual device is unhidden.

18. The method of claim 14, wherein:
the second device is hidden and unhidden to prevent and permit, respectively, sensitive data to be accessed.

* * * * *